United States Patent [19]

Merklinghaus et al.

[11] Patent Number: 4,932,856

[45] Date of Patent: Jun. 12, 1990

[54] APPARATUS FOR THERMOFORMING HOLLOW ARTICLES

[75] Inventors: Horst Merklinghaus, Lübreck-Stockelsdorf; Herbert Voske, Kummesse, both of Fed. Rep. of Germany

[73] Assignee: Maschinebau Gabler GmbH, Lübeck, Fed. Rep. of Germany

[21] Appl. No.: 699,029

[22] Filed: Feb. 7, 1985

[30] Foreign Application Priority Data

Feb. 7, 1984 [DE] Fed. Rep. of Germany ....... 3404107

[51] Int. Cl.$^5$ .............................. B29C 51/32
[52] U.S. Cl. .................. 425/302.1; 264/548; 264/153; 264/550; 425/384; 425/388; 425/403.1
[58] Field of Search .......... 425/302.1, 289, DIG. 201, 425/291, 400, 301, 304, 384, 387.1, 388, 403.1; 264/153, 554, 553, 551, 550, 549, 544, 151; 156/250, 251

[56] References Cited

U.S. PATENT DOCUMENTS

| 3,340,714 | 9/1967 | Pohl et al. | 425/384 |
| 3,785,762 | 1/1974 | Butzko | 425/289 |
| 4,086,045 | 4/1978 | Thiel et al. | 425/326.1 |
| 4,105,736 | 8/1978 | Padovani | 264/153 |
| 4,317,420 | 3/1982 | Sander | 425/302.1 |
| 4,384,836 | 5/1983 | Winstead | 425/145 |
| 4,695,422 | 9/1987 | Curro et al. | 264/154 |

Primary Examiner—Jill L. Heitbrink
Attorney, Agent, or Firm—Louis E. Marn

[57] ABSTRACT

An apparatus for thermoforming hollow articles including forming molds and die cutting molds disposed in spaced-apart relationship wherein the web or sheet of thermoplastic material is sequentially moved or indexed in an integrated operation whereby an article formed in the forming molds is advanced into proper alignment with respect to the die cutting molds and die cut, and subsequently withdrawn to an appropriate storage assembly. The forming molds and die cutting molds being positioned on upper and lower platens.

13 Claims, 4 Drawing Sheets

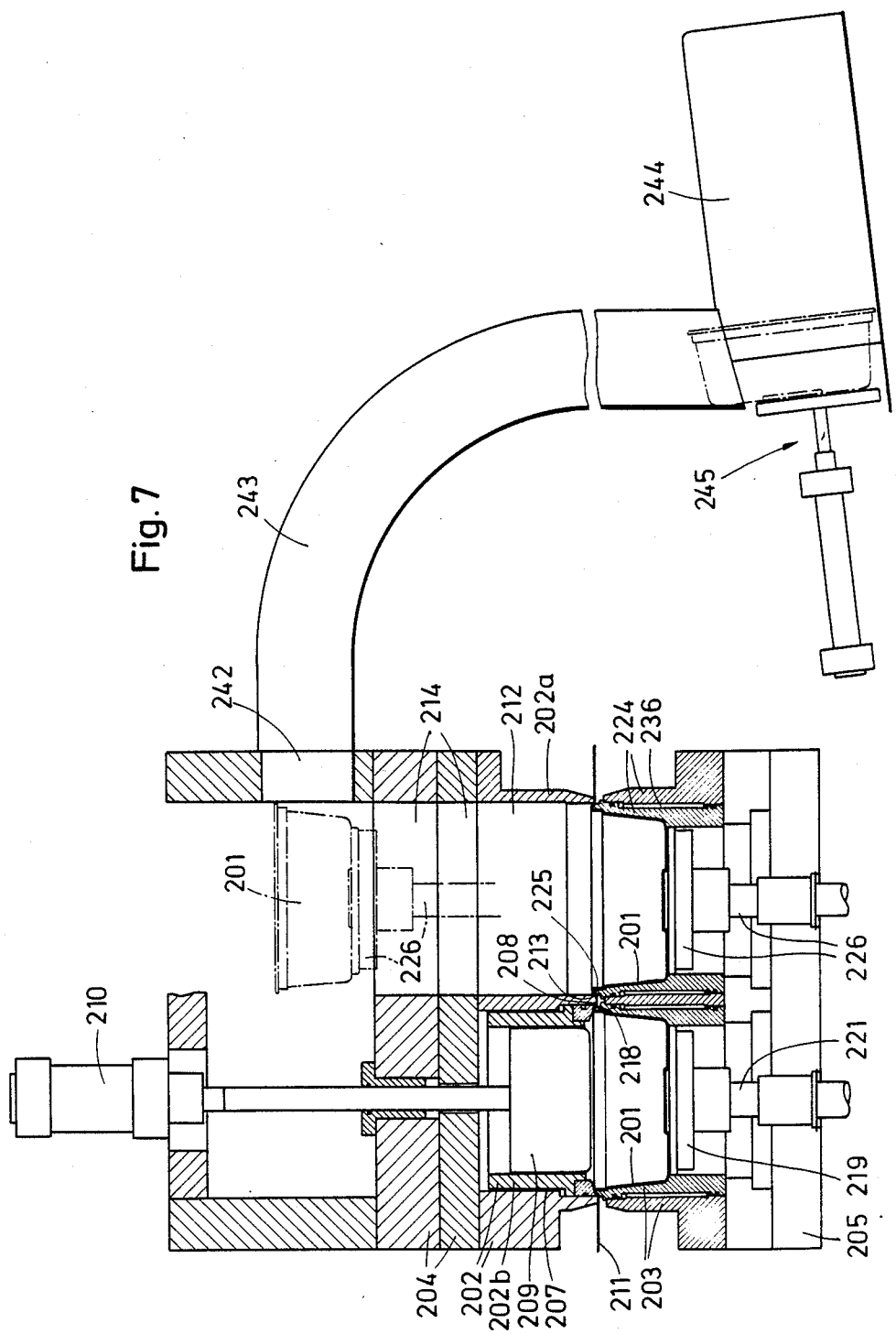

APPARATUS FOR THERMOFORMING HOLLOW ARTICLES

BACKGROUND OF THE INVENTION

1. Field of the Invention

This invention relates to a process and apparatus for thermoforming hollow articles, such as cups, dishes or lids, and more particularly to an improved process and apparatus for thermoforming hollow articles including concomitant die cutting of the thus formed hollow article.

2. Description of the Prior Art

This invention is particularly concerned with thermoforming operations in which a web or sheet of thermoplastic material is first softened by heat and then formed or shaped while in this stretchable plastic state by being drawn or pressed against the contours of a mold or die under the influence of a fluid pressure differential. The former may be exemplified by the application of pressure within a pressure box or female mold assembly produced by compressed air or the like, to press the softened material against the countours of a male mold or core pin. Alternately, a vacuum may be applied from within a female mold while allowing atmospheric pressure to shape the heat softened thermoplastic material against the surface of the female mold. For many purposes, a combination of these two techniques is preferred with the softened sheet material being subjected to vacuum on the face contacting the mold surfaces and to a substantial positive pressure on its other face as such combination provides greater versatility and better control in the forming operations.

Apparatus for effecting thermoforming operations, in general, is comprised of a press having upper and lower platens on which are mounted a male mold assembly and female mold or pressure box assembly. In this regard, the male mold is generally mounted on the lower platen, however, this is normally a matter of choice. Prior to forming of the sheet of thermoplastic material as hereinabove discussed, a clamping assembly normally constituting a part of the male mold assembly is first caused to trap the sheet of thermoplastic material about the entrance into the female mold or the pressure box assembly including a cooperating clamping grid. Thereafter, the male mold of the male mold assembly is caused to pass through the plane of the thermoplastic material and eventually form the hollow article, as hereinabove discussed. Relative movement of the male and female mold assemblies is effected by hydraulic cylinder or electric motor assemblies together with associated cams, gears, support arms, etc., to move the platens whereas movement of a clamping assembly is effected by an associated cylinder assembly.

The hydraulic cylinder or electric motor assemblies are large even for small thermoforming apparatus and have large energy requirements. In this application the term fluid cylinder assembly is to be interpreted as the combination of a cylinder, piston and rod which is operated by a pressurized fluid, i.e. a gas or a liquid.

Die cutting of the hollow article is generally effected in another apparatus including die cutting elements into which is introduced the web or sheet of thermplastic material including thus formed hollow articles. Die cutting in a separate operation suffers from alignment problems as well as problems associated with die cutting of cooled thermoplastic materials, e.g. splitting and the like, as well as cost considerations, i.e. a separate assembly.

Other known assemblies include the thermoforming and die cutting of the hollow article without indexing of the heated sheet of thermoplastic material, with the article being laterally drawn off and moved upwardly to a stacking device.

In many assemblies, the hollow articles are subjected to further finishing operations in a corresponding appropriate finishing device, e.g. punching, embossing, printing, testing or the like. Such finishing devices are expensive, require space, are time consuming and result in the manufacture of a certain number of unacceptable products.

OBJECTS OF THE INVENTION

It is an object of the present invention to provide an improved process and apparatus for thermoforming hollow articles which overcome the problems of the prior art.

Another object of the present invention is to provide an improved process and apparatus for thermoforming hollow articles wherein molding and die cutting of the hollow articles are sequentially performed in the same apparatus.

Still another object of the present invention is to provide an improved process and apparatus for thermoforming hollow articles permitting of facile die cutting of the thus formed articles.

SUMMARY OF THE INVENTION

These and other objects of the present invention are achieved in a thermoforming apparatus including forming molds and die cutting molds disposed in spaced-apart relationship wherein the web or sheet of thermoplastic material is sequentially moved or indexed in an integrated operation whereby an article formed in the forming molds is advanced into proper alignment with respect to the die cutting molds and die cut, and subsequently withdrawn to an appropriate storage assembly.

BRIEF DESCRIPTION OF THE DRAWINGS

The invention will be more clearly understood by reference to the following detailed description of exemplary embodiments thereof when taken with the accompanying drawings wherein like numerals designate like parts and wherein:

FIG. 7 is an enlarged vertical side view, partially in section, of still another embodiment of the present invention.

DETAILED DESCRIPTION OF THE INVENTION

It will be appreciated that the type of thermoplastic or thermoelastically deformable material employed in the present process is generally determined by the economics and duty in which the hollow article will eventually be placed. Among the many thermoplastic resins suitable for various purposes and adaptable to thermoforming are high-impact polystyrene, polybutadiene, styrene-butadiene blends or copolymers, polyvinylchloride and related vinyl polymers, polyallomers, nylon, formaldehyde polymers, polyethylene, polypropylene, nitrocellulose, cellulose acetate, cellulose propionate, cellulose acetate, acetate butyrate, polymethylmethacrylate, ethyl cellulose, benzyl cellulose and ethylesters of cellulose.

Figure 1:
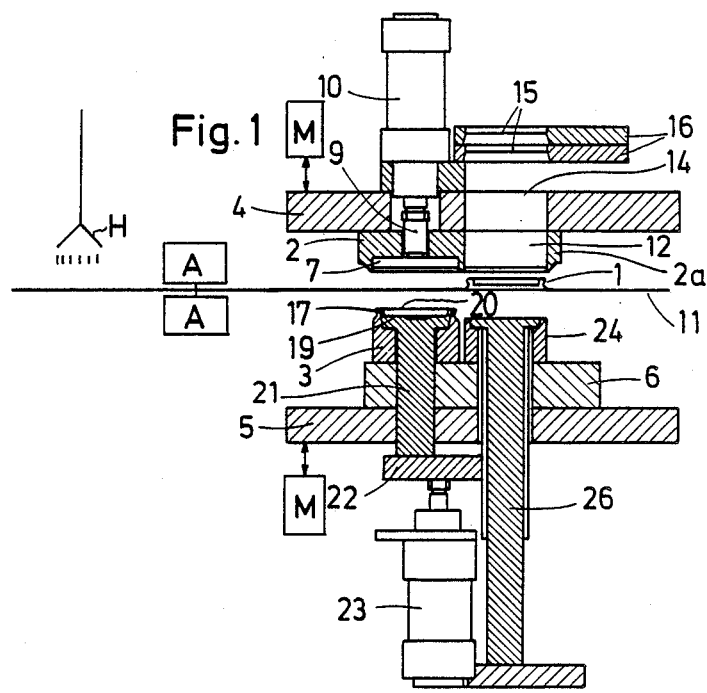
FIG. 1 is a side view, partially in section, of a portion of the thermoforming apparatus illustrating the principles of the present invention with some accessories omitted for greater clarity.

Referring now to the drawings and particularly FIGS. 1 to 5, and more particularly to FIG. 1, there is illustrated a portion of a thermoforming machine comprised of an upper tool member 2 and a lower tool member 3 mounted to an upper and lower platen 4 and 5, respectively. The lower tool member 3 is mounted via an intermediate plate member 6 to the lower platen 5. The upper and lower platens 4 and 5 are constructed and arranged for vertical movement in the thermoforming machine by suitable mechanism M for thermoforming a sheet 11 of thermoplastic material.

Figure 5:
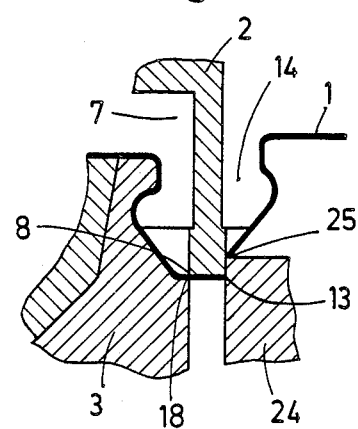
FIG. 5 is an enlarged sectional view of an area X of FIG. 2.

The upper tool member 2 is formed with a substantially cylindrically-shaped recess 7 and a spaced-apart cylindrically-shaped channel 12 defining a circularly-shaped sealing edge 8 and a circularly-shaped cutting edge 13 of a tool portion 2a of the upper tool member 2, respectively, referring particularly to FIG. 5 with the spacing between the recess 7 and the channel 12 being in conformity with indexing distances of the sheet of thermoplastic material. The upper tool member 2 is formed with a cylindrically-shaped channel in coaxial alignment with the recess 7 in which is disposed a cross-hole die member 9 mounted for reciprocal movement to a fluid cylinder 10 mounted to the upper platen 4. As illustrated in FIG. 1, the cross-hole die member 9 is withdrawn within the cylindrically-shaped channel therefor and does not come into contact with the heated sheet 11 of thermoplastic material during forming of the hollow article thereby preventing tempering marks from being formed thereon. The upper platen 4 is provided with a cylindrically-shaped channel 14 in coaxial alignment with the channel 12. Above the channels 12 and 14 there is provided stacking plate members 16 including stacking orifices 15 also in coaxial alignment with the channels 12 and 14 as more fully hereinafter disclosed.

The lower tool member 3 is formed with a recess defining a circularly-shaped ring portion 17 and a circular scoring edge 18 extending upwardly and in coaxial alignment with the recess 7 of the upper tool member 2, with the scoring edge 18 cooperating with the sealing edge 8 of the upper tool member 2, as more fully hereinafter discussed. In the recess of lower tool member 3, there is disposed a deforming male mold 19 including a cylindrically-shaped recess 20 mounted to or formed as a part of a guide rod 21 mounted to a plate member 22 mounted to a fluid cylinder 23 for reciprocal movement through the lower platen member 5. On the intermediate plate member 6, there is disposed a cylindrically-shaped tool 24 including circularly-shaped cutting edge 25 (FIG. 5) in coaxial alignment with the channel 12 of the upper tool member 2 for cooperating with the cutting edge 13 of tool portion 2a of the upper tool member 2. The cylindrically-shaped tool 24, intermediate plate member 6 and the lower platen 5 are formed with cylindrically-shaped channels for receiving an ejection member including an ejection rod 26 mounted for reciprocal movement to a suitable fluid cylinder (not shown).

The following description in conjunction with FIGS. 1 to 4 describes the sequence of steps in the formation of a hollow article in accordance with the present invention. As is known to one skilled in the art, the upper and lower platens 4 and 5 in an initial position are above and below the sheet 11 of thermoplastic material to allow unimpeded horizontal passage of the formed article through the apparatus upon horizontal advancement (left to right) of the sheet 11 of thermoplastic material.

Figure 2:
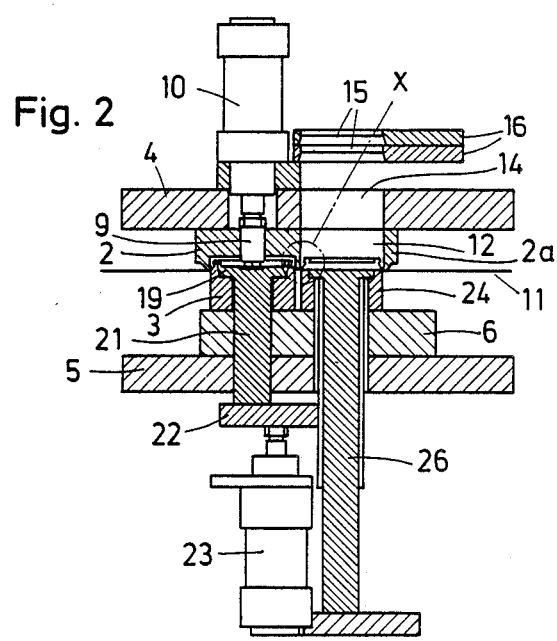
FIGS. 2 to 4 are schematic vertical side sections of the apparatus of FIG. 1 sequentially illustrating the formation and die cutting of a hollow article.

In operation, the sheet 11 of thermoplastic material softened to an optimum forming temperature by suitable means, such as radiant heaters H, infrared lamps, etc., is advanced or indexed by advancing assembly A into a position between the upper and lower platens 4 and 5, referring specifically to FIG. 1. The upper platen 4 is caused to be lowered by upper mechanism M to a point where the upper tool member 2 contacts the sheet 11 of thermoplastic material with the lower platen 5 being caused to be moved upwardly by lower mechanism M to a point where the circularly-shaped ring portion 17 of the lower tool member 3 passes through the plane of the sheet 11 of thermoplastic material, as illustrated in FIG. 2. The scoring edge 18 of the lower tool member 3 cooperates with the sealing edge 8 of the upper tool member 2, as illustrated in FIG. 5, to form a circularly-shaped scored portion about the hollow article 1 being formed between the recess 7 of the upper tool member 2 and the lower tool member 3. In the position illustrated in FIG. 2, the cross-hole die member 9 is lowered into the cylindrically-shaped recess 20 and cooperates with the deforming male mold portion 19 of the lower tool member 3 to form a cross cut.

During such cooperative lowering and raising of the upper and lower platens 4 and 5, the scored hollow article 1 formed in the forming station and indexed laterally therefrom is now positioned between tool portion 2a including channel 12 of the upper tool member 2 and the lower die cutting cylindrically-shaped tool 24 whereby the scored portion of the thus formed hollow article 1 is completely cut by cooperation of the cutting edge 13 of the tool portion 2a with the circularly-shaped cutting edge 25 of the cylindrically-shaped tool 24, referring again to FIG. 5. The relative diameter between the edges 13 and 25 is smaller than the relative diameter between the edges 8 and 18 since slight cutting irregularities may be tolerated.

Figure 3:
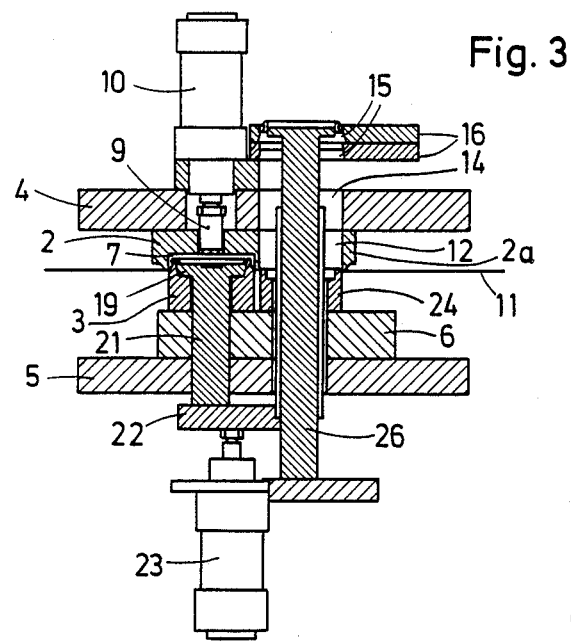

After a predetermined time period, the fluid cylinder associated with the ejecting member and ejection rod 26 is activated to cause upward movement thereof to a point where the severed hollow article 1 engages an article orifice 15 of the stacking plate members 16, as illustrated in FIG. 3. The article orifices 15 are designed to retain the hollow article therein during retraction of the ejection rod 26.

Figure 4:
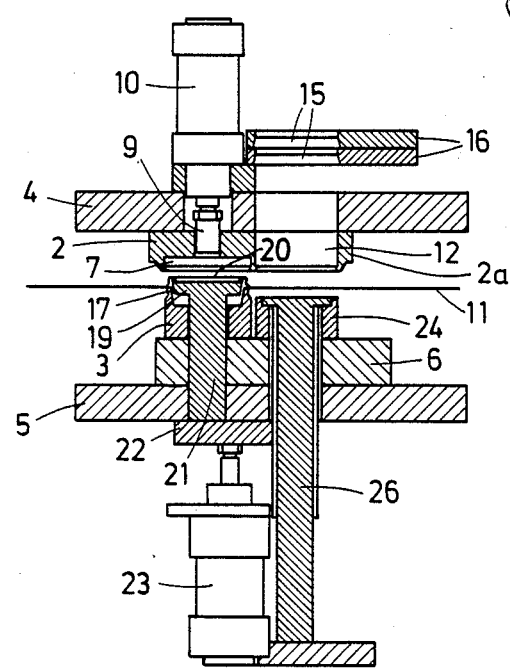

Upon the ejection rod 26 reaching a lowered position, the upper platen 4 is raised as illustrated in FIG. 4. To ensure that the thus formed article is separated from the circularly-shaped ring portion 17 prior to indexing of the heated sheet 11 of thermoplastic material, the fluid cylinder 23 is activated to cause the guide rod 21 and related deforming male mold portion 19 to be simultaneously raised during lowering of the lower platen 5 eventually to the position illustrated in FIG. 1, thereby lifting the thus formed hollow article 1 and the heated sheet 11 of thermoplastic material. Once the platens have assumed the position illustrated in FIG. 1 and guide rod 21 and related deforming male mold portion 19 lowered, the heated sheet 11 of thermoplastic material is indexed or moved (from left to right), referring to FIGS. 1 to 4, and the thermoforming cycle repeated.

In the embodiment of the present invention, as illustrated in FIGS. 1 to 4, it will be understood that the cylindrically-shaped tool 24 may be integrally formed with the tool member 3. Additionally, it will be understood that a further tool may be provided, e.g. a further finishing operation or a leakage test, between the forming molds and die cutting tools. Still further, while the present invention is illustrated with only one recess 7 in upper tool member 2 and cooperating channels 12 and 14 and die cutting tools 2a and 24 (i.e. "one-up"), it will be understood that a plurality of such items may be provided essentially in a plane vertical to the plane of the drawings. The thus formed hollow article is described as being circularly-shaped, however, hollow articles formed in accordance with the present invention may be square-shaped, rectangularly-shaped, etc., with appropriate modification to the tools.

Figure 6:
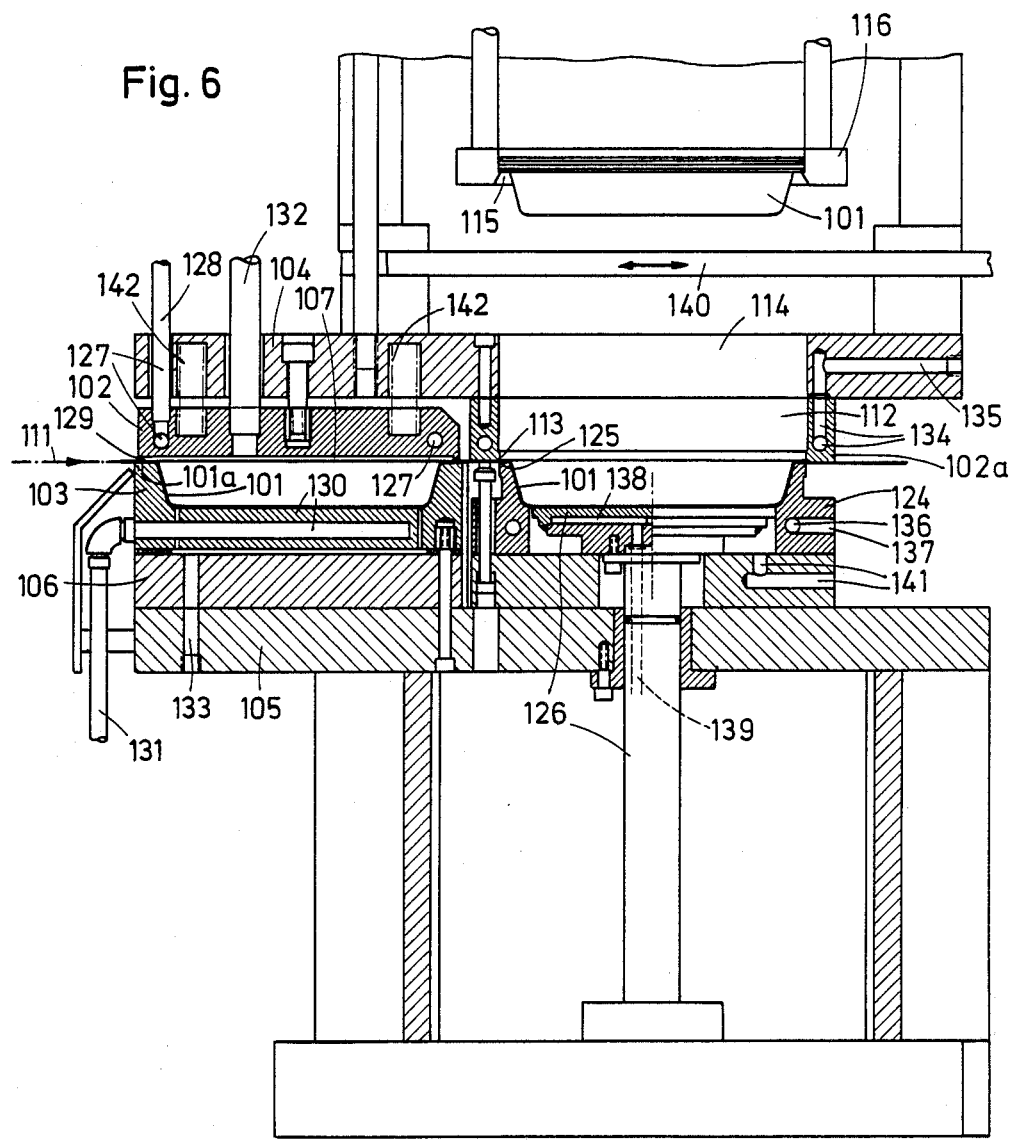
FIG. 6 is an enlarged vertical side view, partially in section, of another embodiment of the present invention.

The basic structure and mode of operation of the thermoforming assembly for forming hollow articles illustrated in FIG. 6 are substantially the same as those for the thermoforming assembly of FIGS. 1 to 5, with numeral designations, however, being prefixed by 100.

Referring now to FIG. 6, the upper tool member 102 is formed with channels 127 for the passage of a cooling fluid, e.g. cooling water, introduced into the channels 127 by a conduit 128, and with a conduit 132 in fluid communication with a source of compressed air. The upper tool member 102 is formed with a frame-like rib portion 129 maintained at a temperature considerably below the temperature of heated sheet 11 of thermoplastic material by the cooling medium flowing through the channels 127 therein.

The lower tool member 103 is formed with an internal chamber 130 for positioning a heating cartridge, or for the introduction of a heating medium, e.g. hot water via conduit 131 to maintain the lower tool member 103 at optimum forming temperatures to minimize any problems in the forming of the hollow article 101. The frame-like rib portion 129 of the upper tool member 102 engages an edge area 101a of the thermoplastic sheet 111 about the lower tool member 103 during lowering and raising of the platens to permit compressed air to be introduced therebetween via conduit 132 to force the heated sheet 111 of thermoplastic material against the contours of the lower tool member 103. The lower tool member 103 is provided with a conduit 133 to vent to the atmosphere the lower tool member 103. It will be understood by one skilled in the art that conversely, conduit 133 may be placed on the suction side of a pump with conduit 132 being in fluid communication with the atmosphere to form the hollow article.

The upper cutting tool 102a is separate from the upper tool member 102 and is mounted to the upper platen 104 and is formed with channels 134 for the passage of a cooling fluid, e.g. cooling water introduced into the channels 134 by a conduit 135. The lower die member 124 is similarly formed with channels 136 for the passage of a cooling fluid, e.g. cooling water, introduced into the channels 136 via conduit 137. The ejection plate and piston member 126 are provided with channels 138 and 139 for passage of a cooling fluid, e.g. cooling water.

The upper platen 104 is provided with a slide plate 140 to place channels 112 and 114 in a sealed airtight relationship after lowering and raising of the upper and lower platens 10 and 105, respectively, with the lower die member 124 provided with channels 141 in fluid communication to the atmosphere.

In operation of the apparatus of FIG. 6 with the platens 104 and 105 in an opened position, the sheet of thermoplastic material 111 is heated in a stepwise manner to a forming temperature, e.g. 120° C. The heated sheet of thermoplastic material 111 is advanced or indexed into the thermoforming assembly. The platens 104 and 105 are lowered and raised, respectively, with the frame-like rib portion 129 of the upper tool member 102 contacting the heated sheet 111 of thermoplastic material about the area 101a thereof and against the lower tool member 103. Compressed air is introduced via conduit 132 through upper tool member 102 to force the heated sheet 111 of thermoplastic material against the contours of the lower tool member 103 maintained at forming temperatures by the heating fluid introduced via conduit 131 into the internal chamber 130 during formation of the hollow article 101. A peripheral edge portion 101a of the hollow article 101 is cooled by contact with the cooled frame-like rib portion 129 of the upper tool member 102.

After a predetermined time period, the platens 104 and 105 are raised and lowered, respectively, with platen 105 being lowered to the extent necessary to permit free passage of the thus formed hollow article 101 upon subsequent indexing or advancement (left to right) of the heated sheet 111 of thermoplastic material. Upon indexing of the heated sheet 111 of thermoplastic material, the hollow article 101 is positioned between the upper and lower die cutting die cutting tools 102a and 124, respectively, with the peripheral edge portion 101a being aligned with the cutting edges 113 and 125 of the upper and lower cutting dies 102a and 124, respectively. Upon lowering and raising of the upper and lower platens 104 and 105, respectively, the cutting edge 125 of the lower cutting die 124 is caused to partially penetrate throughout a major portion of a thickness of the sheet 111 of thermoplastic material. The thus formed hollow article 101 is cooled by contact with the cooled contours of the lower cutting die 124 and ejection plate and rod member 126, assisted by compressed air via a conduit (not shown) through cooperation of the slide plate 140 endorsing channels 112 and 114. Thereafter, the lower platen 105 is raised slightly further whereby the cutting edge 125 of the lower cutting die 124 completely severs the hollow article 101 from the sheet 111 of thermoplastic material. To permit such operation without interfering with the operation of the molding tool members 102 and 103, the upper tool member 102 is resiliently mounted to the upper platen 104 by members 142.

The lower platen 105 is provided with cam discs (not shown) permitting for problem free adjustable movement of the lower platen 105 wherein the cam discs are shaped to permit initial partial cutting followed by complete cutting of the hollow article 101. After complete die cutting of the hollow article 101, the ejection plate and rod member 126 is raised to thereby transport the thus cut hollow article to the stacking orifices 115 of the stacking member 116.

The apparatus illustrated in FIG. 6 is particularly advantageously used for thermoforming hollow articles from PET plastic sheets or films.

The basic structure and mode of operation of the thermoforming assembly for forming hollow articles illustrated in FIG. 7 are substantially the same as those for the thermoforming assembly of FIGS. 1 to 5, with numeral designations, however, being prefixed by 200, and similarly may advantageously process PET plastic sheets or films.

Referring now to FIG. 7, the upper tool member 202 and upper cutting die member 202a are mounted to upper platen 104 whereas cooperating lower tool member 203 and lower cutting die member 224 are mounted to lower platen 205. The upper tool member 202 is provided with a plug assist member 209 mounted for vertical movement to fluid cylinder 210 by a rod member. The lower tool member 203 is provided with a deforming head 219 mounted on a guide rod 221 for vertical movement by a fluid cylinder (not shown) mounted on the lower platen 205. The lower die cutting member 224 is provided with an ejection plate and rod member 226 for vertical movement by a fluid cylinder (not shown) mounted on the lower platen 205.

A heated sheet 211 of thermoplastic material is advanced or indexed into the thermoforming assembly including upper and lower platens 204 and 205 disposed in an opened position. Thereupon, the upper and lower platens 204 and 205 are lowered and raised, respectively, and the heated sheet 211 of thermoplastic material captured between the upper and lower tool members 202 and 203. The plug assist member 209 is caused by the fluid cylinder 210 to be lowered to stretch the heated thermoplastic sheet 211 to ensure for more uniform wall thickness distribution of the thermoplastic material with the thermoforming process for forming hollow article 201 being completed by use of compressed air or vacuum introduced or withdrawn, respectively, as hereinabove discussed.

After a predetermined time period for formation of the hollow article 201, the lower platen 205 is lowered with concomitant raising of the deforming head 219 by the fluid cylinder 210 cooperating with the guide rod 221 thereby supporting the deep drawn hollow article 201. Thereafter, the deforming head 219 is lowered to permit advancement or indexing of the heated sheet 211 of thermoplastic material including the hollow article 201, as hereinabove discussed, to the point where the hollow article 201 is in coaxial alignment with the upper and lower cutting dies 202a and 224.

Initiation of another operational cycle, including the raising of the lower platen 205, permits the thus formed hollow article 201 to assume the contours of the lower die 224 wherein the hollow article 201 is supported on the ejection plate and rod member 226 with concomitant initial cutting of the hollow article 201 about an edged area thereof from the sheet 211 of the thermoplastic material by cooperation of the cutting edges 213 and 225 of the upper and lower cutting dies 202a and 224, respectively. Thereafter, complete cutting of the hollow article 201 is effected by the raising of the ejection plate and rod member 226 eventually to the position illustrated by the dotted-dashed lines through the channels 212 and 214 to a point proximate an article orifice 242 cooperating with an article passage 243 for passage laterally of the hollow 201 article to a stacking chute 244 including a stacking piston assembly, generally indicated as 245.

It will be appreciated by one skilled in the art that the apparatuses of the present invention advantaegously permit operation thereof at fast cycling speeds as a result of the small distances, i.e. one indexing of the sheet of thermoplastic material between thermoforming of the hollow article and die cutting of the hollow article from the heated thermoplastic sheet. Additionally, the apparatus of the present invention is significantly less expensive than thermoforming apparatus of the prior art since the upper and lower platens of the present invention support thermoforming molds and the cutting dies and the like, as distinguished from prior art assemblies requiring separate feeding assemblies resulting in improper cutting of the hollow article. Cooling of the cutting dies, as described and illustrated in FIG. 6, substantially improves effectiveness of the cutting edges thereof, thereby minimizing any heating effect of the heated thermoplastic material being processed, while permitting of die cutting while the thermoplastic material is still warm.

As hereinabove discussed in one embodiment of the present invention, an edge area of the thermoplastic sheet about the thus formed hollow article is cooled during thermoforming to permit more efficacious cutting about such cooled edge area. This type of process provides the advantageous possibility to punch or cut out the total thickness of the cooled down sheet, because the mold edge area which surrounds the given hollow article is approximately at the temperature, already during the thermoforming, which assures an effectiveness of the immediately subsequent punching process. Furthermore, it offers the advantageous opportunity of a more rapid cycle succession, because molding is effected in the first tool section with punching and stacking performed in a second tool section.

This thermoforming process is particularly advantageous when applied to the forming of composite foils of thermoplastic materials, for example, a composite foil having layer distribution of PP/PYDC/PP. Such composites would have to be deformed at least in the crystalline melting point if deep drawing parts should be made for sterile packaging, and the processes of the present invention are particularly advantageous in lengthening service life of the cutting edges since the sheet may be heated to temperatures of up to 170° C. (at which temperature the thermoplastic material crystallizes) and initially scored in a hot stage and cutting of the hollow article completed at a lower temperature in a manner to maintain the cutting edge clean and to minimize splintering thereof.

While the present invention has been described in connection with several exemplary embodiments thereof, it will be understood that many modifications will be apparent to those of ordinary skill in the art; and that this application is intended to cover any adaptations or variations thereof. Therefore, it is manifestly intended that this invention be only limited by the claims and the equivalents thereof.

What is claimed:

1. In a thermoforming apparatus for forming a hollow plastic article from a sheet of thermoplastic material including upper and lower platens having upper and lower forming molds, respectively, means for heating said sheet of thermoplastic material to thermoforming temperatures, means for advancing said heated sheet of thermoplastic material through said thermoforming apparatus between said upper and lower platens, and means for relatively moving said upper and lower platen means to form said hollow article with said upper and lower forming molds, the improvement comprising:

an upper finishing tool positioned on and mounted to said upper platen and a cooperating lower finishing tool positioned on and mounted to said lower platen, said finishing tools being spaced-apart from said forming molds, and said thermoforming apparatus including a slide member for sealing said finishing tools in an air tight manner, said finishing tools cooperating to remove said hollow article from said sheet of thermoplastic material prior to withdrawal of said sheet from said thermoforming apparatus and means for cooling said finishing tools.

2. The thermoforming apparatus as defined in claim 1 wherein said upper and lower finishing tools are integrally formed with respective upper and lower forming molds.

3. The thermoforming apparatus as defined in claim 1 or 2 wherein said finishing tools are die cutting tools for excising said hollow article from said sheet of thermoplastic material.

4. The thermoforming apparatus as defined in claim 3 wherein said forming molds include cutting edges for scoring said hollow article during formation thereof in said forming molds.

5. The thermoforming apparatus as defined in claim 4 wherein said die cutting tools are formed with peripheral cutting edges to completely excise said hollow article and further including ejector means for removing said excised hollow article from said die cutting tools.

6. The thermoforming apparatus as defined in claim 5 wherein said ejector means is coupled to a fluid cylinder for reciprocal movement with respect to said die cutting tools.

7. The thermoforming apparatus as defined in claims 1 or 2 and further including a scoring tool associated with said forming molds.

8. The thermoforming apparatus as defined in claims 1 or 2 and further including means for cooling said forming molds.

9. The thermoforming apparatus as defined in claim 8 wherein said cooling means is associated with said upper forming mold mounted to said upper platen for cooling a rib portion contacting said heated sheet of thermoplastic material prior to forming of said hollow article.

10. The thermoforming apparatus as defined in claim 8 and further including heating means incorporated into said lower forming mold mounted to said lower platen.

11. The thermoforming apparatus as defined in claims 1 or 2 and further including a plug assist for stretching said heated sheet of thermoplastic between said forming molds.

12. The thermoforming apparatus as defined in claim 11 wherein said plug assist is associated with said upper forming mold mounted to said upper platen and is mounted for reciprocal movement therein by a fluid cylinder.

13. The thermoforming apparatus as defined in claim 5 and further including means for transporting said hollow article to a stacking assembly.

* * * * *